C. W. LOE & T. L. MITCHELL.
COTTON SEED PLANTER.
APPLICATION FILED OCT. 19, 1912.
1,057,487.
Patented Apr. 1, 1913.
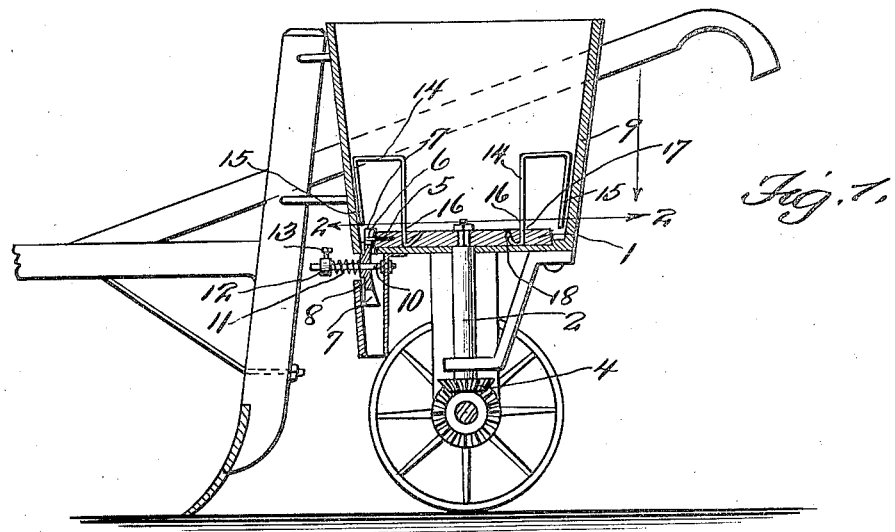
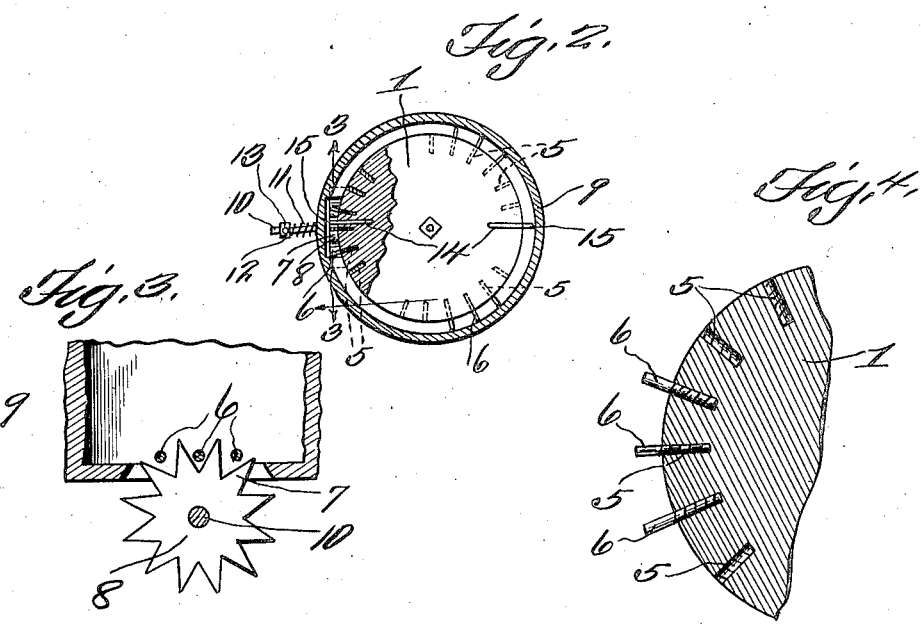
Witnesses
Inventors
C. W. Loe
T. L. Mitchell,
By
Attorneys

UNITED STATES PATENT OFFICE.

CHARLES W. LOE AND THOMAS L. MITCHELL, OF GOREE, TEXAS.

COTTON-SEED PLANTER.

1,057,487.  Specification of Letters Patent.  Patented Apr. 1, 1913.

Application filed October 19, 1912. Serial No. 726,751.

*To all whom it may concern:*

Be it known that we, CHARLES W. LOE and THOMAS L. MITCHELL, citizens of the United States, residing at Goree, in the county of Knox and State of Texas, have invented a new and useful Cotton-Seed Planter; and we do hereby declare the following to be a full, clear, and exact description of the invention, such as will enable others skilled in the art to which it appertains to make and use the same.

This invention relates generally to the art of seeders and planters, and particularly to a new and useful edge drop feeder or seeder, adapted particularly for dropping or planting cotton seed in hills, at any distance apart, as may be desired, thereby saving considerable seed, as well as saving substantially one-half the labor of thinning the cotton after it has reached a proper growth.

Another object of the invention is the provision of agitator arms carried by the disk, for wiping the inner circumference of the seed receptacle, so as to thoroughly undermine and agitate the seed in the receptacle.

There are disclosed in the drawing certain features of construction, but in practical fields these features may necessitate alterations, to which the patentees are entitled, provided the alterations are comprehended within the scope of what is claimed.

The invention comprises further features and combination of parts, as hereinafter set forth, shown in the drawings and claimed.

In the drawings:—Figure 1 is a sectional view through a portion of the seed box, showing the improved edge drop feeder or seed planting mechanism as applied. Fig. 2 is a horizontal sectional view through the seed box, showing parts broken away and parts in elevation. Fig. 3 is an enlarged fragmentary detail sectional view of the seed box, showing the toothed member 8 and the fingers 6. Fig. 4 is an enlarged fragmentary detail sectional view of the disk 1, showing one of the groups of fingers 6, the number of which may be increased or decreased, or interchanged or replaced.

Referring more particularly to the drawings 1 designates a disk, which is mounted on and operated by the shaft 2, which in turn is operated by any suitable means, such as that indicated at 4. At this point of the specification it is well to mention that the mechanism for operating the disk, forms no part of the present invention, therefore, any suitable means or conventional form of mechanism may be employed, for imparting motion to the disk. This disk 1 is provided with a plurality of threaded recesses 5, arranged in series on the periphery of the disk, adapted to receive the threaded pins or fingers 6, the number of which to each series may be increased or decreased, and are adapted to engage the teeth 7 of the toothed member 8, which knocks the seed from the seed receptacle 9. These series or groups of pins or fingers are designed particularly for the purpose of dropping or planting cotton seed or other seed in hills, at various distances apart, thereby saving considerable seed, heretofore unnecessarily used, as well as saving approximately one-half of the labor in planting. The toothed member 8 is intermittently rotated, and if the pins are increased in number, the toothed member 8 will be further rotated, thereby increasing the feeding of the seed, but if the pins are decreased in number, the amount of seed fed is decreased. The toothed member is held in place on the shaft 10, by the spring 11 and collar 12, which is held in adjusted positions by the thumb screw 13.

The disk 1 is provided with a pair of agitator arms 14, which are U-shaped in cross section, the yieldable free portions 15 of which are adapted to wipe against the inner circumference of the seed receptacle, so as to thoroughly agitate and undermine the seeds. Each agitator is secured to the disk by passing its lower portion 16 through the aperture 17, and re-insert the same in the recess 18 of the under-side of the disk, so as to prevent displacement of the agitator arms.

From the foregoing it will be noted that there has been provided a simple, efficient and desirable edge drop feeder, for cotton seed planters, comprising a disk having replaceable fingers arranged in series, whereby the feeding of the seeds may be increased or decreased, and one which has been found practical in its adaptation to planters.

The invention having been set forth, what is claimed as new and useful is:—

In combination with a seed receptacle having an edge drop feed mechanism including a disk member, of a pair of agitator arms secured to the disk, said arms being U-shaped in contour and having yieldable free portions adapted to wipe against the inner circumference of the seed receptacle, for thoroughly agitating and under-mining the seeds so as to prevent clogging.

In testimony whereof we have signed our names to this specification in the presence of two subscribing witnesses.

CHARLES W. LOE.
TOM L. MITCHELL.

Witnesses:
T. B. PHILLIKER,
T. C. GRIFFIN.